(12) United States Patent
New (10) Patent No.: US 7,509,610 B1
(45) Date of Patent: Mar. 24, 2009

(54) TIMING ANALYSIS FOR PROGRAMMABLE LOGIC DEVICES FABRICATED IN DIFFERENT FABS

(75) Inventor: Bernard J. New, Carmel Valley, CA (US)

(73) Assignee: XILINX, Inc., San Jose, CA (US)

( * ) Notice: Subject to any disclaimer, the term of this patent is extended or adjusted under 35 U.S.C. 154(b) by 404 days.

(21) Appl. No.: 11/502,938

(22) Filed: Aug. 11, 2006

(51) Int. Cl.
*G06F 17/50* (2006.01)

(52) U.S. Cl. ............... 716/6; 716/4; 716/5; 716/16; 716/17

(58) Field of Classification Search .......... 716/4, 716/5, 6, 16, 17
See application file for complete search history.

(56) References Cited

U.S. PATENT DOCUMENTS

| | | | |
|---|---|---|---|
| 6,871,328 B1 * | 3/2005 | Fung et al. ............ | 716/1 |
| 7,200,824 B1 * | 4/2007 | Sidhu et al. ........... | 716/5 |
| 7,430,730 B2 * | 9/2008 | Ali et al. ............. | 716/13 |
| 2005/0204325 A1 * | 9/2005 | Fung et al. ........... | 716/16 |
| 2006/0022687 A1 * | 2/2006 | Ali et al. ............. | 324/754 |

* cited by examiner

*Primary Examiner*—Sun J Lin
(74) *Attorney, Agent, or Firm*—W. Eric Webostad (57) ABSTRACT

Timing analysis of integrated circuits fabricated in different Fabs is described. A first speed file and a second speed file for a type of integrated circuit respectively fabricated in a first Fab and a second Fab are generated, the first speed file and the second speed file having corresponding types of delays. At least a portion of the corresponding types of delays have different delay values. A circuit design using the first speed file is compiled. The circuit design is for instantiation in programmable logic of the type of integrated circuit. The method further includes checking whether the circuit design as compiled using the first speed file passes timing constraints of the circuit design using the first speed file and checking whether the circuit design as compiled using the first speed file passes the timing constraints of the circuit design using the second speed file.

19 Claims, 6 Drawing Sheets

TIMING ANALYSIS FOR PROGRAMMABLE LOGIC DEVICES FABRICATED IN DIFFERENT FABS

FIELD OF THE INVENTION

One or more aspects of the invention relate generally to timing analysis of integrated circuits fabricated in different fabrication facilities and, more particularly, to timing analysis of programmable logic devices fabricated in different fabrication facilities ("Fabs").

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Heretofore, performance of a design instantiated in programmable logic of an FPGA ("FPGA fabric") was done for FPGAs fabricated in a single Fab (fabrication facility). Accordingly, because each device was manufactured in the same Fab, such devices generally had equivalent performance levels, subject to variation within the semiconductor processing of the single-Fab environment. For example, devices manufactured within a single Fab had different maximum operating frequencies and thus were binned into bins according to these differences ("speed binning").

For each speed bin, speed files for each particular type of FPGA were generated. These speed files were created with worst-case delays for each type of part of an FPGA for a particular speed bin. Timing analysis for an FPGA, in contrast to timing analysis for an application-specific integrated circuit ("ASIC"), is less deterministic as a circuit design instantiated in programmable logic may significantly vary from user to user. Thus, since each user may have a different design, it is more difficult to know whether timing constraints of a design may be met after instantiation in an FPGA, in contrast to fabrication of such design as an ASIC.

For an FPGA, delays associated with sub-circuits are characterized. Because such sub-circuits may be repeated, possibly for thousands of instances in each FPGA, the same delay may be characterized once for each instance of a sub-circuit of an FPGA. Examples of different classes of delay include routing delay, Look Up Table ("LUT") delay, and flip-flop clock-to-out delay, among other well-known classifications of sub-circuit delays.

In a single Fab environment, a speed file created for an FPGA would define the worst-case performance delays of sub-circuits of such FPGA. The speed file may then be used to assist compilation of a user's circuit design for instantiation into the FPGA fabric. Thus, a user may verify that performance requirements, including timing constraints, could be met by instantiation of such circuit design into a target FPGA platform.

However, multiple Fabs, which may be multiple foundries, may be used to manufacture FPGAs. Variation in semiconductor processing among these Fabs promotes different delay values for same sub-circuits of a same FPGA part type.

Accordingly, it would be both desirable and useful to provide means for performance characterization of integrated circuits having programmable logic manufactured in a multi-Fab environment.

SUMMARY OF THE INVENTION

One or more aspects of the invention generally relate to timing analysis of integrated circuits fabricated in different fabrication facilities and, more particularly, to timing analysis of programmable logic devices fabricated in different fabrication facilities ("Fabs").

An aspect of the invention a method for timing analysis of integrated circuits fabricated in different Fabs. A first speed file for a type of integrated circuit fabricated in a first Fab and a second speed file for the type of integrated circuit fabricated in a second Fab are generated, the first speed file and the second speed file having corresponding types of delays. At least a portion of the corresponding types of delays have different delay values as between the first speed file and the second speed file. A circuit design using the first speed file is compiled. The circuit design is for instantiation in programmable logic of the type of integrated circuit. The method further includes checking whether the circuit design as compiled using the first speed file at least meets timing constraints of the circuit design using the first speed file and checking whether the circuit design as compiled using the first speed file at least meets the timing constraints of the circuit design using the second speed file.

Another aspect of the invention is a method for circuit design for instantiation in programmable logic of a type of programmable logic device. The method includes a first manufacturing of a first integrated circuit in a first Fab as the type of programmable logic device. The first manufacturing includes characterizing first delays of the first integrated circuit manufactured in the first Fab and generating a first speed file for the first integrated circuit. The method further includes a second manufacturing of a second integrated circuit in a second Fab as the type of programmable logic device. The second manufacturing includes characterizing second delays of the second integrated circuit manufactured in the second Fab and generating a second speed file for the second integrated circuit. Timing of the circuit design for instantiation in the programmable logic of the type of programmable logic device is verified for the first integrated circuit and for the second integrated circuit. Such verification is done independently for qualification of both the first Fab and the second Fab.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
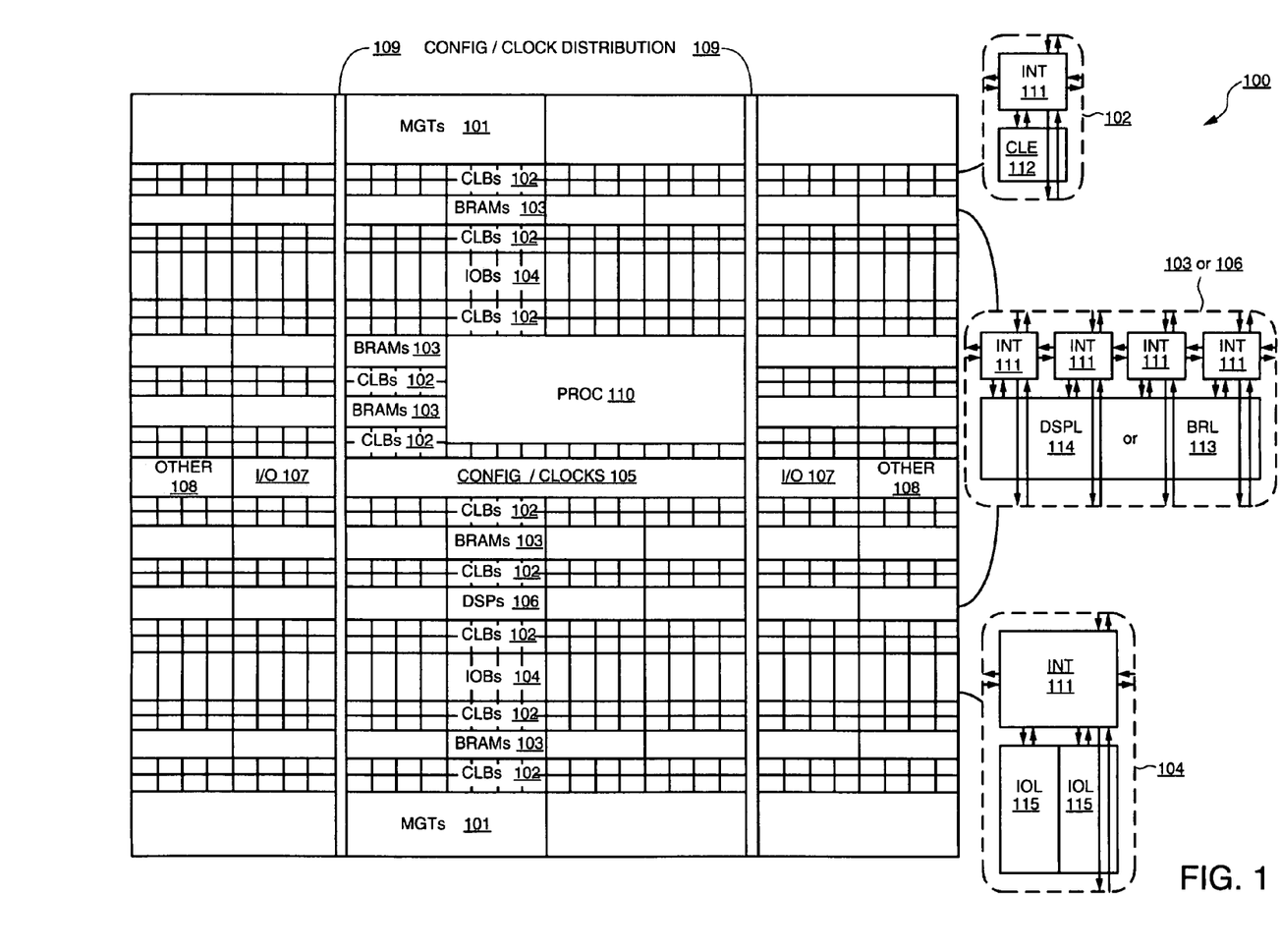
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Although the following description is in terms of FPGAs, it should be understood that other integrated circuits having programmable logic may be used. Furthermore, it should be understood that examples of sub-circuits, sometimes referred to as basic elements, of FPGAs are described. However, these basic elements may be different in other integrated circuit contexts. In particular, Look Up Tables ("LUTs"), flip-flops, and routing delays are described, although it is known that other sub-circuit delays may be used for other associated basic elements for characterizing delay for purposes of timing analysis.

Additionally, it should be understood that although the following description is in terms of two Fabs, namely Fab 1 and Fab 2, more than two Fabs may be used. As shall become apparent, parts may be binned in such a way that a customer ordering a part does not specify a particular Fab in which such part was manufactured. Where a single speed file is used for same parts regardless of which Fab or Fabs manufactured such parts and without any performance impact associated with manufacturing in one Fab over another, it may appear to a customer as if an FPGA supplier's parts have been manufactured in a single-Fab environment.

Heretofore, a speed file was constructed having a compilation of worst-case delays for a type of FPGA. Thus, for example, if there were two Fabs, an FPGA part manufactured by both Fabs would have one speed file containing the worst-case delay values from among the worst-case delay values from each of the Fabs. If, however, as may often be the situation, each of the Fabs is faster in some regards but slower in other regards, using this set of worst-case delay values compiled from worst-case delay values from all Fabs manufacturing that FPGA part to provide a single speed file leads to an overly harsh estimate of FPGA performance.

To avoid the above-described problems generated by using a single speed file, separate speed files may be created for same devices manufactured in different Fabs. These separate speed files may be respectively associated with particular speed bins. Timing of a user's circuit design may therefore be analyzed according to the separate speed files for each of the Fabs. For example, if a circuit design meets a user's timing constraints with FPGAs manufactured in either of Fab 1 or Fab 2, using all speed files from such Fabs, then both Fab 1 and Fab 2 may be sources for such parts. Thus, use of a single speed file may be represented by worst-case delay values equal to $$\Sigma \text{Max}(d_{1i}, d_{2i}), \quad (1)$$

where $d_{1i}$ and $d_{2i}$ are delays associated with Fabs 1 and 2, respectively, and for an $i^{th}$ delay. Use of separate speed files may be represented by worst case delay values equal to $$\text{Max}(\Sigma d_{1i}, \Sigma d_{2i}). \quad (2)$$

By effectively separating out the summations, the individual delays of the parts may be less in Equation 2 than in Equation 1, as will be further illustrated in Table 1 below. Notably, it is possible that the outcomes of Equations 1 and 2 are equal. However, by independently verifying timing constraints according to speed files for respective Fabs, it may be shown that more FPGAs will meet a user's timing requirements than a set of worst case delays of all such Fabs.

Figure 2A:
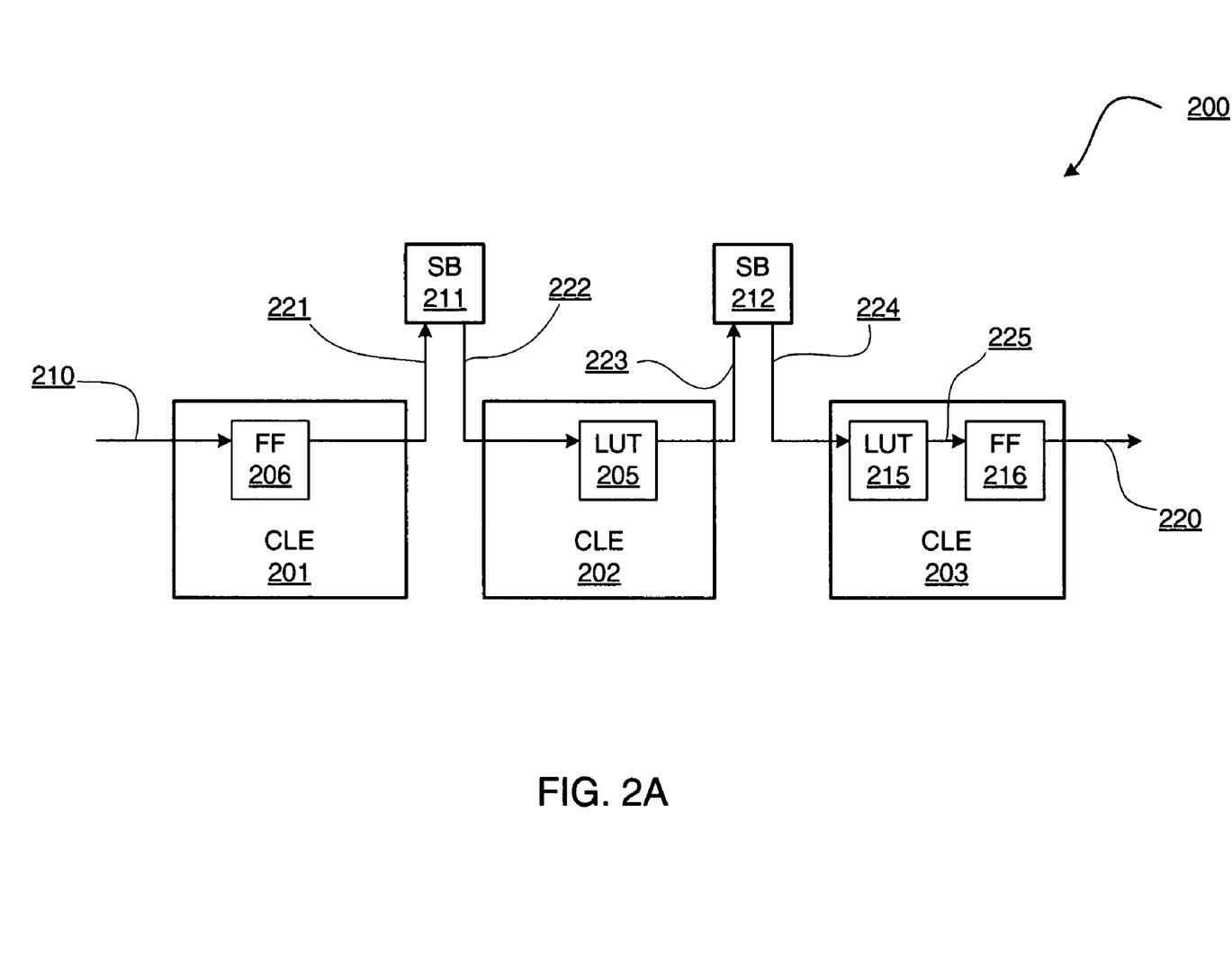
FIG. 2A is a block diagram depicting an exemplary embodiment of a portion of FPGA fabric, such as of the FPGA of FIG. 1.

FIG. 2A is a block diagram depicting an exemplary embodiment of a portion 200 of FPGA fabric, such as of FPGA 100 of FIG. 1. An input signal 210 is provided to a flip-flop 206, and output of such input signal 210 from flip-flop 206 may be associated with a clock-to-output delay of flip-flop 206. Flip-flop 206 may be of a CLE 201. Output from flip-flop 206 is routed to switchbox ("SB") 211 via routing 221. Output of switchbox 211 may be routed, via routing 222, to LUT 205 of CLE 202. Output of LUT 205 may be routed to switchbox 212 via routing 223. Routing 224 may be used to couple output of switchbox 212 to LUT 215. LUT 215, which may be of CLE 203, may be coupled to flip-flop 216 also of CLE 203 via CLE internal routing 225. Output 220 of flip-flop 216 may be a resultant output for a circuit design instantiated in portion 200. As is understood in synchronous timing analysis, time from a source flip-flop to a destination flip-flop, where there are no sequential or clocked circuits between such source and destination flip-flops, includes a clock-to-out delay of the source flip-flop and a setup time delay of the destination flip-flop for timing analysis of the associated path between such flip-flops. Accordingly, for timing analysis from source flip-flop 206 to destination flip-flop 216, there will be a clock-to-out delay associated with flip-flop 206, as previously described, and a setup time delay associated with destination flip-flop 216. Notably, the embodiment of FIG. 2A is merely an example to clearly illustrate how different delays may result for a same instantiation of a circuit in a same type of FPGA. Thus, portion 200 instantiated in an FPGA manufactured in Fab 1 may have an overall delay from clocking out of signal 210 from a source flip-flop to setting up of signal 220 in a destination flip-flop which is equivalent to or different from portion 200 instantiated in a same type of FPGA but manufactured in Fab 2. However, by not combining worst-case delays of both Fabs 1 and 2, or in other words using separate speed files from Fab 1 and Fab 2, it may be shown that performance of a user design may be met in each instance of portion 200 in FPGAs manufactured in Fabs 1 and 2, even though such performance would not have been met by using the worst-case delay values of both of Fabs 1 and 2. In order to illustrate this point, Table 1 (below) includes example values for delays of portion 200, as well as a total delay for input signal 210 to become output signal 220.

TABLE 1

| | Worst-Case Delays | | |
| --- | --- | --- | --- |
| Sub-circuit | Fab 1 | Fab 2 | Fabs 1 & 2 |
| LUT 205 | 10 | 12 | 12 |
| Routing 221 | 3 | 2 | 3 |
| Switchbox 211 | 5 | 6 | 6 |
| Routing 222 | 2 | 3 | 3 |
| Flip-flop 206 (clock-to-out) | 8 | 9 | 9 |
| Routing 223 | 4 | 3 | 4 |
| Switchbox 212 | 5 | 6 | 6 |
| Routing 224 | 4 | 2 | 4 |
| LUT 215 | 10 | 12 | 12 |
| Routing 225 | 2 | 1 | 2 |
| Flip-flop 216 (setup time) | 1 | 2 | 2 |
| Total Worst-Case Delay | 54 | 58 | 63 |

Notably, these delays in Table 1 are examples and have been exaggerated for purposes of clarity and not limitation. Additionally, again, although routing, LUT, flip-flop, and switchbox delays are shown, it should be understood that other types of known delays may be characterized.

With reference to Table 1, it should be appreciated that both LUTs, namely LUTs 205 and 215, are presumed to be basic elements having a same worst-case delay. Additionally, flip-flops 206 and 216 are also assumed to be basic elements, and even though each may be assumed to have a same worst-case delay for both clock-to-out and setup time delays, clock-to-out delay is used for flip-flop 206 and setup time delay is used for flip-flop 216. Additionally, switchboxes 211 and 212 are assumed to be basic elements, each having a same worst-case delay. However, although routings 221 through 225 may have the same timing, they need not, as they are different types of routings. For example, routings 221 and 222 differ, as one is from a flip-flop to a switchbox and the other is from a switchbox to a LUT, respectively. Furthermore, routings 223 and 224 are different from one another and from routings 221 and 222, as routing 223 is from a LUT to a switchbox, and routing 224 is from a switchbox to a LUT. Lastly, routing 225, which is from a LUT to a flip-flop within a CLE, is different from any of routings 221 through 224.

Table 1 uses normalized units of time to indicate delays associated with each of these sub-circuits of FIG. 2A. Notably, the total worst-case delay for portion 200 manufactured in Fab 1 is 54 units of time, and the total worst-case delay for portion 200 manufactured in Fab 2 is 58 units of time. If, for example, a user's timing requirement for input to output, namely from signal 210 to signal 220, was 59 units of time, it should be appreciated that FPGAs manufactured in either of Fabs 1 or 2 may be used for such a user's circuit design.

However, if a set of worst-case delay values were taken from the combined worst-case delay values of Fabs 1 and 2, as indicated in the far right column of Table 1, then the total worst-case delay for portion 200 would be 63 units of time. In this instance, a user would not be able to use an FPGA from either of Fabs 1 or 2, or may have to pay more for an FPGA at a higher speed bin ("binning up"), if such an FPGA were available. Alternatively, or in addition to binning up, a user may have to redesign the user's circuit in order to meet the combined worst-case timing constraints. Thus, it should be appreciated that by having separate speed files for each of Fabs 1 and 2, a significant amount of cost may be avoided.

Figure 2B:
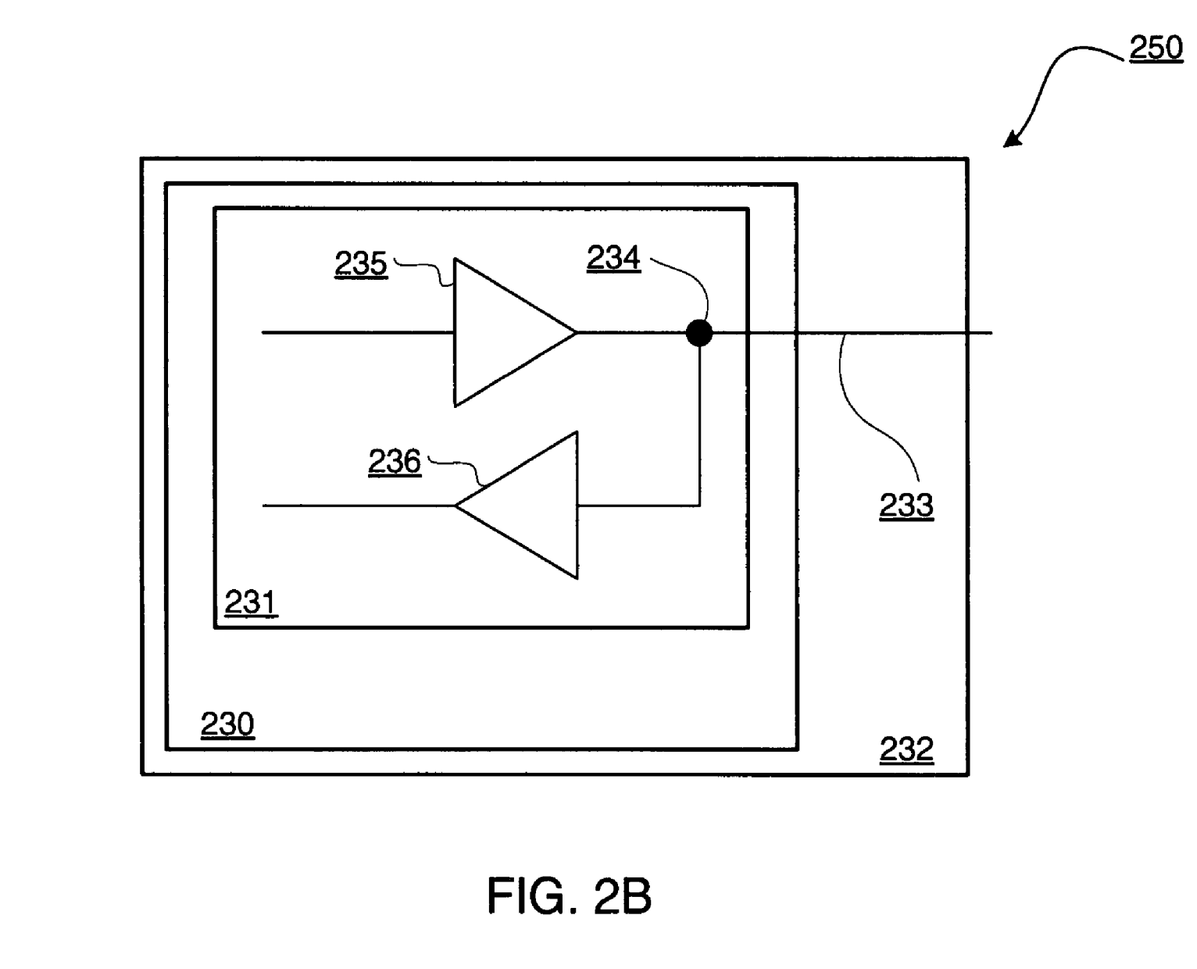
FIG. 2B is a block diagram depicting an exemplary embodiment of a packaged FPGA.

Although portion 200 is shown only for internal timing delays of an FPGA, it should be appreciated that external timing, namely off-chip timing, may play a factor in such delays. Accordingly, FIG. 2B is a block diagram depicting an exemplary embodiment of a packaged FPGA 250. Packaged FPGA 250 may include a package 232 used to encapsulate an FPGA die 230. FPGA die 230 may have an IOL 231 configured for a user's design. Delays associated with output buffer 235 and input buffer 236 may be determined for each FPGA die manufactured and packaged. Thus, speed files may have different values for delays associated with buffers 235 and 236 depending on the Fab in which such buffers were manufactured. Furthermore, there may be a delay associated with route 233 for coupling dies, such as via input/output pad 234 to package 232. Thus, package type and source may also have an impact on the delay associated with a part.

Figure 3:
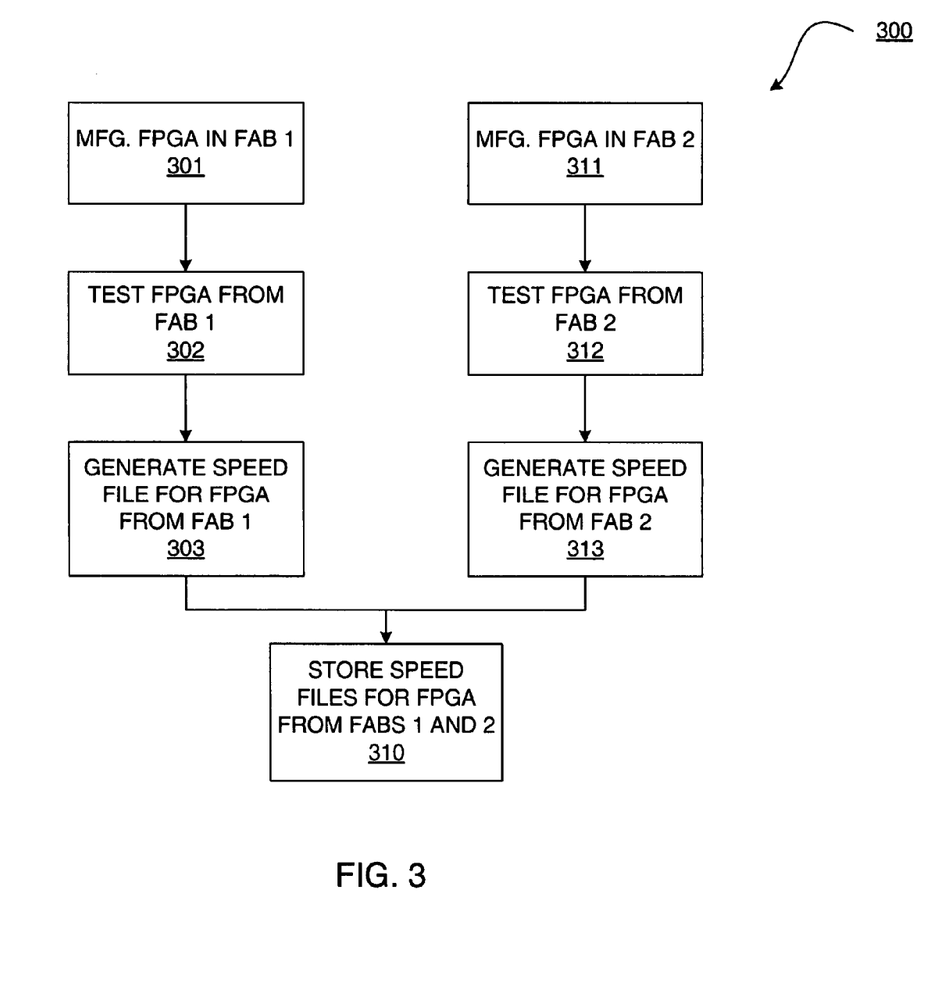
FIG. 3 is a flow diagram depicting an exemplary embodiment of a speed file generation flow.

FIG. 3 is a flow diagram depicting an exemplary embodiment of a speed file generation flow 300. Again, although speed file generation flow 300 is for two Fabs, namely Fabs 1 and 2, it should be appreciated that more than two Fabs may be used. At 301, an FPGA is manufactured in Fab 1. At 311, an FPGA is manufactured in Fab 2. The FPGA manufactured in Fab 1 is tested to characterize delays associated with sub-circuits thereof at 302. The FPGA manufactured in Fab 2 is tested to characterize delays associated with sub-circuits thereof at 312.

From testing done at 302, at 303 a speed file is generated for the FPGA manufactured in Fab 1. From testing done at 312, at 313 a speed file is generated for the FPGA manufactured in Fab 2. At 310 the speed files for Fabs 1 and 2 are stored. Notably, it is assumed that the FPGAs which are to be compared for different Fabs have similar status, namely, the FPGAs are from the same family and are the same device according to a part number. Furthermore, such FPGAs may be specified as having the same package type to the extent such packaging impacts characterization of delays. Lastly, it should be appreciated that different speed files may be associated with each speed bin. Notably, an FPGA part may be speed graded for associated with a speed bin. Thus, speed file generation flow 300 may be repeated for each speed bin to generate an association of speed files to speed bins for each Fab.

Figure 4:
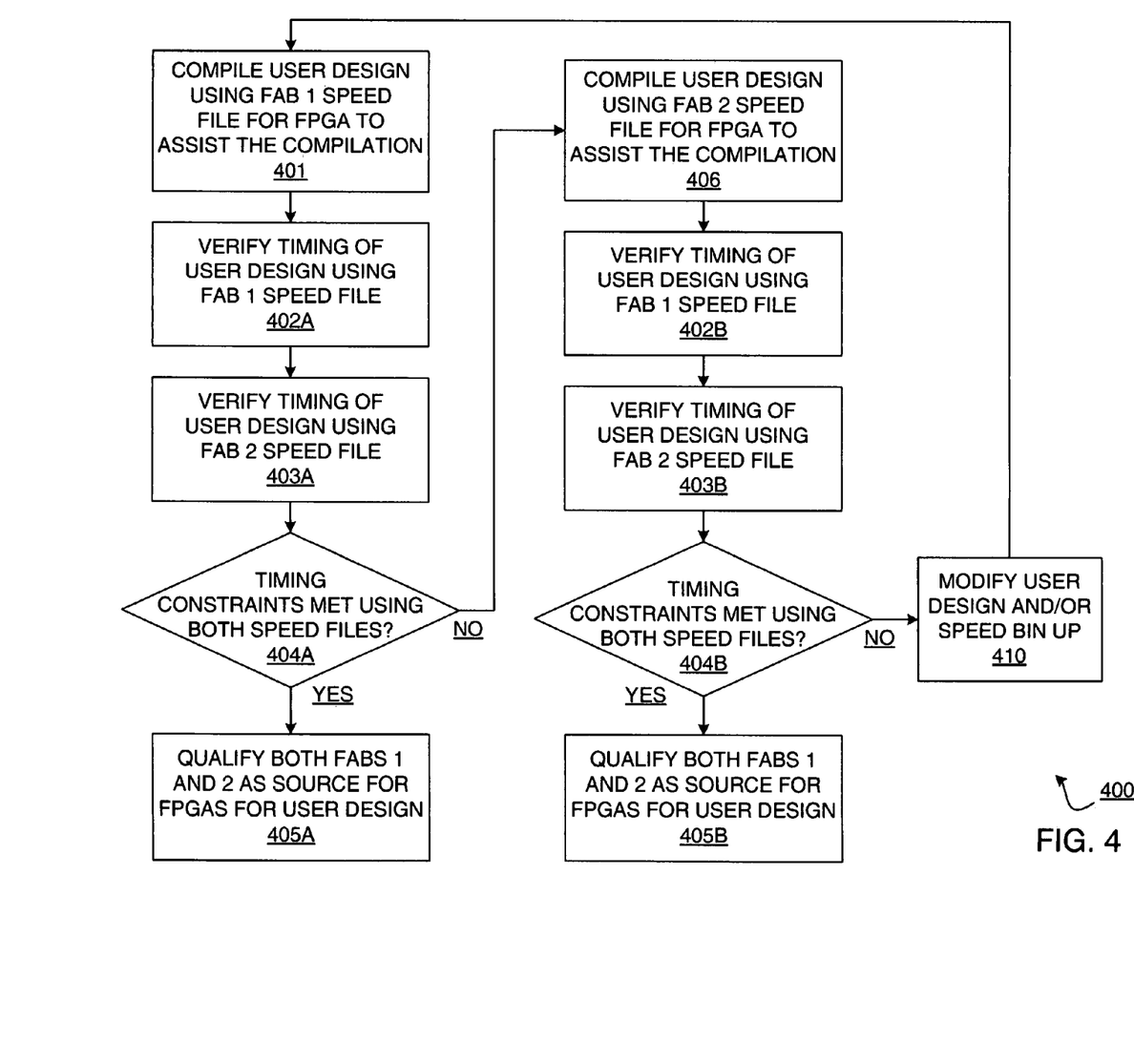
FIG. 4 is a flow diagram depicting an exemplary embodiment of a Fab timing analysis flow.

FIG. 4 is a flow diagram depicting an exemplary embodiment of a Fab timing analysis flow 400. Fab timing analysis flow 400 may begin at 401, where a user's circuit design is compiled using a speed file from Fab. 1. The speed file is for a part to be analyzed, which in this example is an FPGA manufactured in Fab 1. Thus, the speed file associated with the part type of the FPGA manufactured in Fab 1 is used to assist the compilation of the user's circuit design, which compilation may be used for instantiation in FPGA fabric of the target FPGA platform.

At 402A, timing of the user's circuit design is verified using the Fab 1 speed file. Thus, the Fab 1 speed file is used to determine whether or not a user's timing constraints are not met for the user's circuit design as compiled using the FPGA speed file for Fab 1. At 403A, timing of the user's circuit design is verified using a Fab 2 speed file. Thus, the Fab 2 speed file is used to determine whether or not timing constraints of a user's circuit design are met, where the user's circuit design has been compiled using the speed file from Fab 1 for the target FPGA platform.

At 404A, it is determined whether timing constraints of the user's design are met using both the speed files of Fab 1 and Fab 2, as determined respectively at 402A and 403A. If all timing constraints are met in both instances of verification at 402A and 403A, then at 405A both Fabs 1 and 2 may be qualified as sources for FPGAs for the target FPGA platform for a user's circuit design compiled at 401.

It may be that one of the two Fabs' speed files generally has an overall worst-case delay greater than that of the other of the two Fabs' speed files. Thus, in the above example, if the Fab 2 speed file had an overall worst-case delay greater than the Fab 1 speed file, it is possible that one or more timing constraints would fail at 403A, even though all timing constraints may pass at 402A. Accordingly, if at least one timing constraint is not met either at 402A or 403A, then from 404A, the user's circuit design may be compiled again but this time using a Fab 2 speed file for the target FPGA platform to assist such recompilation at 406. Notably, if operations 402A, 403A, and 404A are subroutines, these subroutines may just be re-accessed for verification of the user's design compiled using the Fab 2 speed file at 406. Accordingly, subroutines 402B, 403B, and 404B may be repeated versions of operations 402A, 403A, and 404A, respectively, for verifying timing constraints of a user's design as compiled using the Fab 2 speed file. If all timing constraints are met as verified using the Fab 1 speed file and as verified using the Fab 2 speed file, then both Fabs 1 and 2 may be qualified as sources for FPGAs for a target FPGA platform for the user's circuit design as recompiled at 406, as generally indicated at 405B. Notably, 405A and 405B are distinguishable as to which Fab's speed file was used to arrive at qualification of both Fabs.

If at least one timing constraint is not met at either or both operations 402B or 403B, then at 410, the user's design may be modified to adjust timing paths. Alternatively, or in combination with such modification, a user's design may be binned up at 410 if a higher speed bin is available for the target FPGA platform. Notably, timing analysis flow 400 may be begin at a lowest speed bin level in order to obtain the least expensive solution for a user, and if the lowest speed bin level does not satisfy one or more of the user's timing constraints, then a higher cost may be incurred either by redesign or binning up, or a combination thereof.

Again, it should be appreciated that although the particular integrated circuit example of an FPGA is used, another type of programmable logic device may be used. Moreover, an integrated circuit having programmable logic may be used. A platform may be identified, such as by family and device part number for example. Additionally, a particular package type may be identified for a target part. Accordingly, each FPGA manufactured in a Fab may be tested to see in which speed bin it falls. Furthermore, a speed file associated with each speed bin may be generated. Thus, timing analysis flow 400 may be repeated more than once using different target FPGAs according to speed bin, and thus different sets of speed files.

Figure 5:
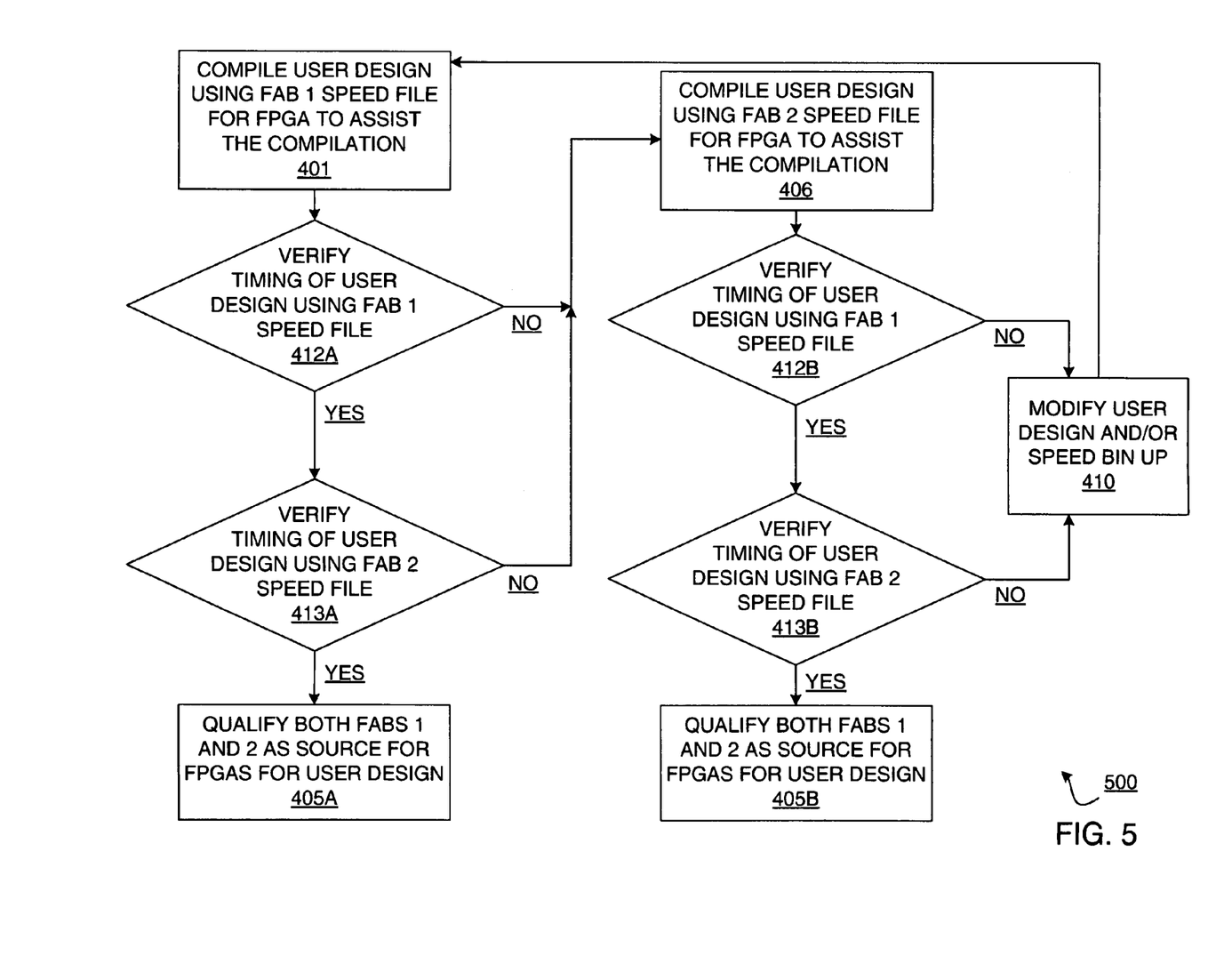
FIG. 5 is a flow diagram depicting an alternative exemplary embodiment of a Fab timing analysis flow.

FIG. 5 is a flow diagram depicting an alternative exemplary embodiment of a Fab timing analysis flow 500. Fab timing analysis flow 500 is similar to Fab timing analysis flow 400 of FIG. 4, except that rather than waiting through an extra verification of timing prior to determining whether one or more timing constraints fail, a decision is made earlier in the flow to reduce runtime. For example, from 401, at 412A a user's circuit design may have its timing verified using a Fab 1 speed file. If all timing constraints are determined as being met at 412A, then the user's compiled design from 401 may be verified for timing using the Fab 2 speed file at 413A. If, however, at 412A it is determined that one or more timing constraints are not met using the Fab 1 speed file, then the user's design may proceed to be compiled using the Fab 2 speed file at 406, thus bypassing 413A. Thus, the extra verification at 413A may be avoided if it is previously determined that one or more timing constraints will not be met using the Fab 1 speed file.

After recompilation at 406, verification and determination at 412B may be done to determine if all timing constraints of a user's design compiled at 406 are met by the Fab 1 speed file. If all timing constraints are met by the Fab 1 speed file at 412B, than at 413B the user's circuit design compiled at 406 may be verified for timing using the Fab 2 speed file. If at 413B, all timing constraints of the user's design are met, then both Fabs 1 and 2 may be qualified as sources for the target FPGA platform for the user's circuit design at 405B. If, however, one or more timing constraints fail at 412B or 413B, than at 410 the user's design may be modified or speed binned up, or a combination thereof for subsequent recompilation at 401.

Accordingly, it should be appreciated that manufacturing of FPGAs in different Fabs has been described. The delays associated with the parts from each Fab are characterized for generating respective speed files for each part type. These speed files may further be graduated according to speed bins. A user's circuit design for instantiation in programmable logic may be compiled using a speed file associated with one of the Fabs. Timing analysis may be conducted to verify whether the compiled circuit design at least meets each of the user's timing constraints for each speed file associated with the Fabs in which the target part is manufactured. If all of the user's timing constraints are at least met as determined for each of the speed files used to verify such timing, then each of the Fabs associated with those speed files for the particular part type may be qualified as sources. If, however, one or more of the timing constraints of the user's circuit design is not met, the process may be repeated using a different speed file for recompiling the user's circuit design.

Therefore, in both Fab timing analysis flows 400 and 500, it should be appreciated that timing verification is done with respective speed files independently from one another for purposes of qualifying Fabs independently. If both Fabs independently qualify, then it is determined that the part may be sourced from either Fab. Thus, worst-case delays respectively associated with such Fabs do not need to be combined for obtaining a set of overall worst-case delays as between the two sets of delays for the respective Fabs for timing verification.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A method for timing analysis of integrated circuits fabricated in different fabrication facilities ("Fabs"), the method comprising:
   generating a first speed file for a type of integrated circuit fabricated in a first Fab;
   generating a second speed file for the type of integrated circuit fabricated in a second Fab,
   the first speed file and the second speed file having corresponding types of delays, at least a portion of the corresponding types of delays having different delay values as between the first speed file and the second speed file;
   compiling a circuit design using the first speed file;
   the circuit design for instantiation in programmable logic of the type of integrated circuit;
   checking whether the circuit design as compiled using the first speed file at least meets timing constraints of the circuit design using the first speed file; and
   checking whether the circuit design as compiled using the first speed file at least meets the timing constraints of the circuit design using the second speed file.

2. The method according to claim 1, further comprising:
   determining that the circuit design as compiled using the first speed file at least meets the timing constraints of the circuit design using both the first speed file and the second speed file; and
   qualifying the first Fab and the second Fab as sources for the type of integrated circuit for instantiation of the circuit design.

3. The method according to claim 2, wherein the type of integrated circuit is a programmable logic device.

4. The method according to claim 3, wherein the programmable logic device is associated with a Field Programmable Gate Array family and a device part number.

5. The method according to claim 3, wherein the programmable logic device is associated with a package type.

6. The method according to claim 1, further comprising:
   determining that the circuit design as compiled using the first speed file does not at least meet one or more of the timing constraints of the circuit design using either or both the first speed file and the second speed file;
   compiling the circuit design using the second speed file;
   checking whether the circuit design as compiled using the second speed file at least meets the timing constraints of the circuit design using the first speed file; and
   checking whether the circuit design as compiled using the second speed file at least meets the timing constraints of the circuit design using the second speed file.

7. The method according to claim 6, further comprising:
   determining that the circuit design as compiled using the second speed file at least meets the timing constraints of the circuit design using both the first speed file and the second speed file; and
   qualifying the first Fab and the second Fab as sources for the type of integrated circuit for instantiation of the circuit design.

8. The method according to claim 7, wherein the type of integrated circuit is associated with at least a Field Programmable Gate Array family and a device part number.

9. The method according to claim 6, further comprising:
   determining that the circuit design as compiled using the second speed file does not at least meet one or more of the timing constraints of the circuit design using either or both the first speed file and the second speed file; and
   modifying the circuit design responsive to failure to at least meet the one or more of the timing constraints.

10. The method according to claim 6, wherein the first speed file and the second speed file are associated with a first speed grade for the type of integrated circuit.

11. The method according to claim 10, further comprising:
    determining that the circuit design as compiled using the second speed file does not at least meet one or more of the timing constraints of the circuit design using either or both the first speed file and the second speed file; and
    changing from the first speed grade to a second speed grade for the type of integrated circuit, the second speed grade being for a higher frequency of operation of the type of integrated circuit than the first speed grade.

12. A method for a circuit design for instantiation in programmable logic of a type of programmable logic device, the method comprising:

first manufacturing of a first integrated circuit in a first Fab as the type of programmable logic device;

the first manufacturing including:

characterizing first delays of the first integrated circuit manufactured in the first Fab; and         generating a first speed file for the first integrated circuit based on the characterized first delays;

second manufacturing of a second integrated circuit in a second Fab as the type of programmable logic device;

the second manufacturing including:

characterizing second delays of the second integrated circuit manufactured in the second Fab; and         generating a second speed file for the second integrated circuit based on the characterized second delays;

verifying timing of the circuit design for instantiation in the programmable logic of the type of programmable logic device for the first integrated circuit and for the second integrated circuit; and     the verifying using the first speed file and the second speed file independently for qualification of both the first Fab and the second Fab.

13. The method according to claim 12, wherein the verifying includes a first compiling of the circuit design with input from the first speed file.

14. The method according to claim 13, wherein the verifying includes a second compiling of the circuit design with input from the second speed file responsive to not all timing parameters associated with the circuit design being met for the first compiling.

15. The method according to claim 14, wherein the type of programmable logic device is a type of Field Programmable Gate Array.

16. The method according to claim 15, wherein the type of Field Programmable Gate Array is associated with a Field Programmable Gate Array family and a device part number.

17. The method according to claim 12, wherein the first speed file and the second speed file are each associated with a first speed grade.

18. The method according to claim 17, wherein the first manufacturing includes generating a third speed file and the second manufacturing includes generating a fourth speed file, the third speed file and the fourth speed file each associated with a second speed grade.

19. The method according to claim 12, wherein respective summations of the first delays and the second delays are each less than a summation of a set of overall worst case delays.

\* \* \* \* \*